June 20, 1961 M. E. DROUGARD ET AL 2,989,733

FERROELECTRIC CIRCUIT ELEMENT

Filed Jan. 17, 1956 6 Sheets-Sheet 1

*INVENTORS*
MAURICE E. DROUGARD
EDWARD J. HUIBREGTSE
DONALD R. YOUNG
BY John E. Dougherty Jr.
AGENT June 20, 1961 M. E. DROUGARD ET AL 2,989,733

FERROELECTRIC CIRCUIT ELEMENT

Filed Jan. 17, 1956 6 Sheets-Sheet 2

*INVENTORS*
MAURICE E. DROUGARD
EDWARD J. HUIBREGTSE
DONALD R. YOUNG
BY John E Dougherty Jr
AGENT

FERROELECTRIC CIRCUIT ELEMENT

Filed Jan. 17, 1956 6 Sheets-Sheet 3

INVENTORS
MAURICE E. DROUGARD
EDWARD J. HUIBREGTSE
DONALD R. YOUNG
BY John E. Dougherty Jr.
AGENT FIG. 6
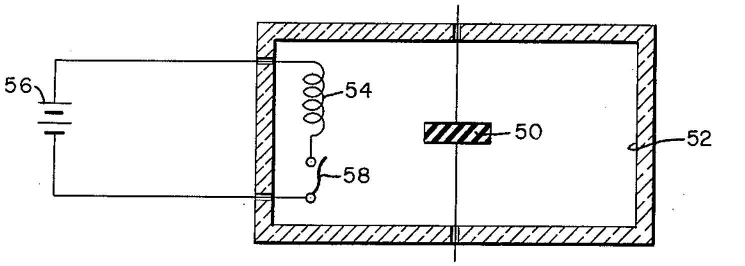
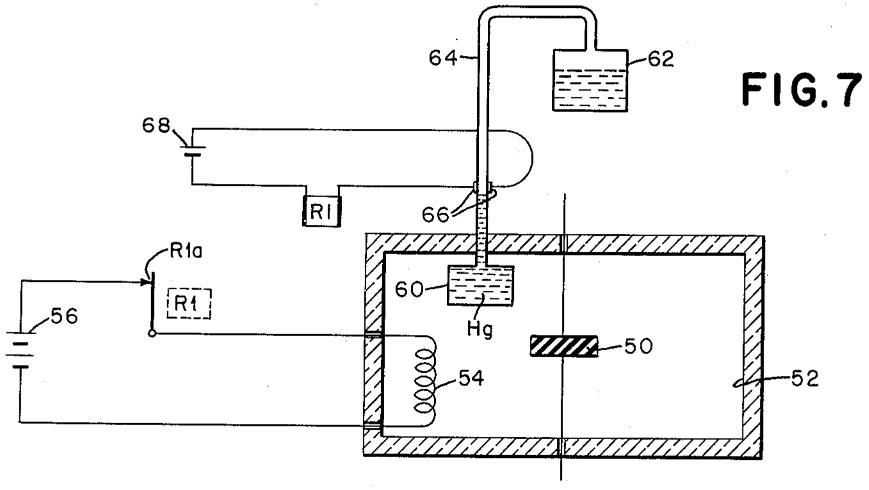
FIG. 8
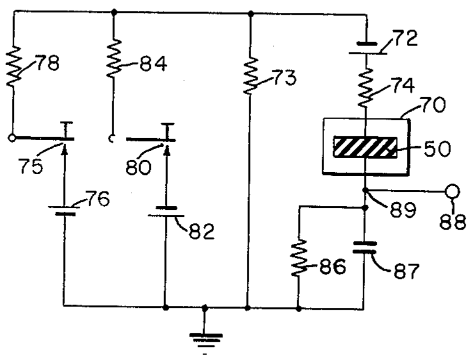
FIG. 9
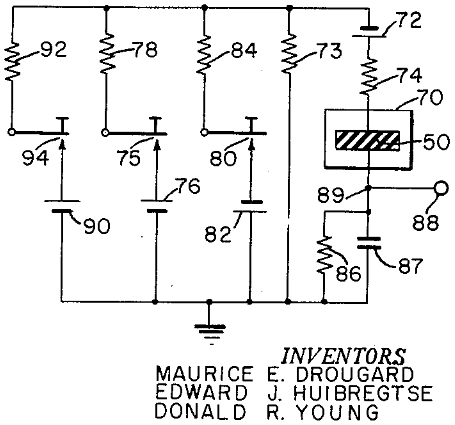
INVENTORS
MAURICE E. DROUGARD
EDWARD J. HUIBREGTSE
DONALD R. YOUNG
BY John E. Dougherty Jr
AGENT INVENTORS
MAURICE E. DROUGARD
EDWARD J. HUIBREGTSE
DONALD R. YOUNG
BY John E. Dougherty Jr
AGENT INVENTORS
MAURICE E. DROUGARD
EDWARD J. HUIBREGTSE
DONALD R. YOUNG
BY John E. Dougherty Jr.
AGENT United States Patent Office
2,989,733
Patented June 20, 1961

2,989,733

FERROELECTRIC CIRCUIT ELEMENT

Maurice E. Drougard, Edward J. Huibregtse, and Donald R. Young, Poughkeepsie, N.Y., assignors to International Business Machines Corporation, New York, N.Y., a corporation of New York Filed Jan. 17, 1956, Ser. No. 559,655
29 Claims. (Cl. 340—173.2)

The present invention relates to ferroelectric capacitors and more particularly to circuit arrangements wherein such capacitors are employed when maintained at or near a temperature at which the particular ferroelectric dielectric material undergoes a structural transition.

The term ferroelectric has been applied to that class of materials which, in one or more of the crystalline states they are capable of assuming, exhibit two stable states of remanent polarization. Such a material may exist in different crystalline forms at different temperatures and the temperature at which it undergoes a structural transition which results in loss of its ferroelectric properties is termed the Curie temperature for the material. When maintained at temperatures below their particular Curie temperature, such materials are said to be in a ferroelectric state and, when maintained at temperatures above the Curie temperature, are said to be in a paraelectric state. The two stable states of remanent polarization exhibited by these materials in their ferroelectric state are in opposite directions and the feasibility of utilizing such a material as the dielectric in a memory capacitor is demonstrated in a variety of patents and patent applications among which may be numbered the Patent No. 2,717,373 issued September 6, 1955 to J. R. Anderson, and the copending applications bearing serial numbers 392, 615, now Patent No. 2,869,111 issued January 13, 1959, and 510,701 which were filed November 13, 1953 and May 24, 1955, respectively, in behalf of D. R. Young and assigned to the assignee of the present application.

The prior art, as is exemplified by the above mentioned patent and patent applications, is primarily directed toward the application of ferroelectric capacitors to data storage problems when the particular ferroelectric material used as a dielectric is maintained in a temperature range substantially different from those temperatures at which it undergoes transitions in its crystalline structure. When so utilized the material remains in the same crystalline state and the two stable states of remanent polarization, which it may be caused to assume by the application of proper electric fields, are in opposite directions.

However, two deleterious effects have been encountered in such applications and have been termed "hysteresis loop decay" and "walking." It has been found that as such ferroelectric capacitors are switched back and forth between their opposite states of polarization a substantial number of times, the hysteresis loop, which defines the change in polarization effected by an applied voltage, eventually shrinks to a point where the remanent states of polarization are no longer distinguishable. This shrinkage is termed hysteresis loop decay or fatigue and greatly limits the application of ferroelectric capacitors in present day matrix type data storage systems. The second obstacle, that of walking, results from the fact that known ferroelectrics, when operated in a single crystalline state, do not have a precisely defined coercive voltage. It has been found that the application of even a very small voltage, if applied long enough or often enough, may be effective to diminish the remanent polarization in a ferroelectric crystal to a point where it is no longer distinguishable by circuitry of the type usually used for this purpose. This characteristic greatly limits the utilization of such capacitors in random access memory arrays wherein each memory element must be capable of withstanding a series of pulses having a magnitude less than a predetermined switching voltage, without altering the remanent state of polarization.

An object of the present invention is to provide an improved ferroelectric capacitor data storage system.

A further object is to provide an arrangement wherein capacitors are not subject to the heretofore troublesome walking and hysteresis loop decay limitations.

Another object is to provide a bi-stable memory element which has a precisely defined coercive voltage and which is capable of being switched from one stable state to the other at exceedingly high speeds.

These objects are accomplished by utilizing as a circuit element a ferroelectric capacitor, the dielectric of which is maintained at or near one of the temperatures at which it undergoes a structural transition. It has been found that, when crystals of certain ferroelectric materials are held at temperatures near those at which transitions in their lattice structure occurs and subjected to an alternating electric field of sufficient magnitude, plural hysteresis curves of charge versus applied voltage are observed. This phenomenon occurs in those ferroelectric materials in which the structural transition is first order and therefore discontinuous, and among the ferroelectrics falling in this class are barium titanate, potassium niobate, and lead titanate. For a discussion of the theoretical aspects of such transitions, reference may be made to the book, "Introduction to Solid State Physics" by Charles Kittel; 1953; chapter 7. Barium titanate, for example, is tetragonal in structure in the temperature range from 5° C. to 120° C., the latter being the Curie temperature for this material. When cooled below 5° C. barium titanate becomes othorhombic and when heated above 120° C. it becomes cubic. It should be noted that these temperatures are approximate and may vary slightly for different crystals of barium titanate. In any case, the transitions occurring at the critical temperatures for a particular crystal are first order. When such a crystal is held at or slightly below its transition temperature in the vicinity of 5° C. and subjected to an alternating electric field of sufficient magnitude, the plot of polarization versus applied electric field exhibits triple hysteresis loops; and, when held at or slightly above its transition temperature in the vicinity of 120° C. and subjected to an alternating electric field of sufficient magnitude, the polarization versus applied electric field characteristic exhibits a double hysteresis loop. The middle one of the three loops in the lower temperature range is symmetrically located with respect to the coordinate axes since barium titanate is ferroelectric in the orthorhombic state. The other two loops are located in the first and third quadrants as are the two loops observed in the higher temperature range. No centrally located loop is observed in the higher temperature range since barium titanate is paraelectric in the cubic state. The loops observed in the first and third quadrants at both the higher and lower transition temperatures are due to the fact that the electric field applied is of sufficient magnitude to cause a transition from either the cubic or orthorhombic state to the tetragonal state. The ability of the material to exist in two different crystalline states at the same temperature is due to the fact that the transition from one state to the other is first order. Since these loops exist entirely in the first and third quadrants, the material may be caused to assume either of two different states of polarization in the same sense for a given applied bias voltage of either polarity. Since, for an applied bias voltage of either polarity, the change from one state of polarization to the other involves a first order transition, the coercive voltage or coercive electric field necessary to produce the change is precisely defined. Further, the dielectric constant of the material when in one of the stable states of polarization for a given bias voltage is different than the dielectric constant for the other stable state of polarization for that bias voltage. This difference in dielectric constant allows for a nondestructive interrogation of the state of polarization of the material. Since the material is entirely polarized in each of the different states, repeated switching from one state to the other does not cause the hysteresis loop to decay.

A feature of the invention lies in the provision of a bistable memory capacitor which can be interrogated nondestructively.

Another feature lies in the provision of a ferroelectric capacitor capable of assuming two stable states of polarization in either of two opposite directions.

Still another feature lies in the provision of a ferroelectric capacitor capable of assuming two stable states of polarization wherein the switching from one of said states to the other involves a structural transition of the ferroelectric material which forms the dielectric of the capacitor.

Another feature of the invention lies in the provision of a novel circuit element comprising a substantially unclamped ferroelectric capacitor electrically and thermally biased in a condition in which it is capable of existing stably in a plurality of crystalline states.

Other objects of the invention will be pointed out in the following description and claims and illustrated in the accompanying drawings, which disclose, by way of example, the principle of the invention and the best mode, which has been contemplated, of applying that principle.

FIGS. 4*a*, 4*b*, 4*c* and 4*d* illustrate the double hysteresis loops obtained when a crystal of barium titanate, maintained at a temperature near 120° C., is subjected to an alternating voltage.

Figure 5:
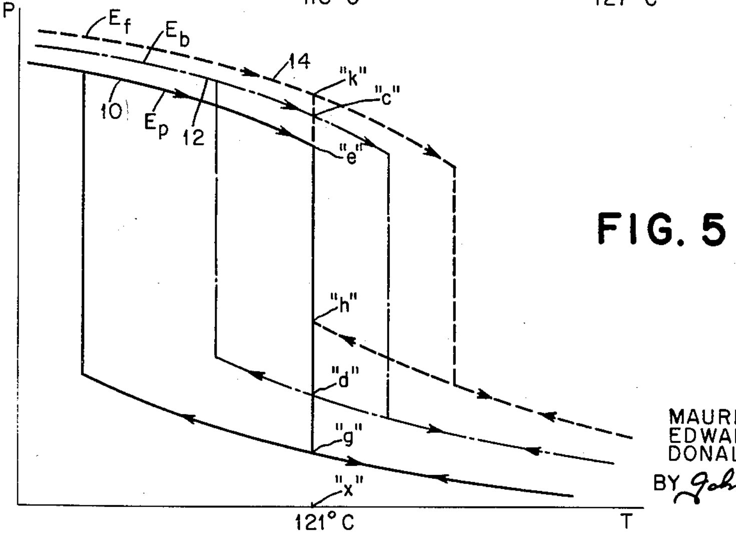

FIG. 5 shows certain of the polarization-temperature characteristics of a barium titanate crystal at the temperature at which a crystal of this material is maintained in one embodiment of the invention.

FIGS. 6 and 7 diagrammatically illustrate methods of maintaining a barium titanate capacitor at a constant temperature in the vicinity of 120° C.

FIGS. 8, 9, 10 and 11 are diagrammatic representations of circuitry embodying the invention.

Figure 11:
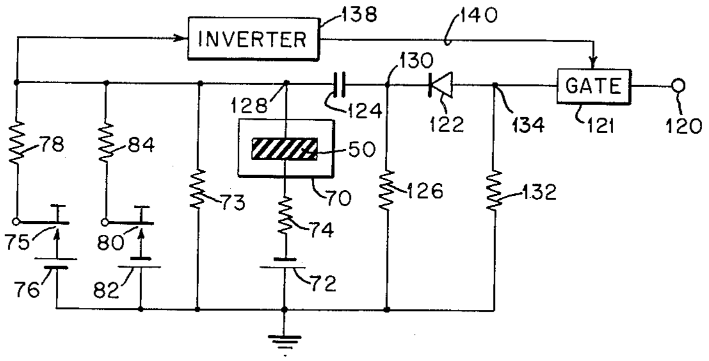
Figure 12:
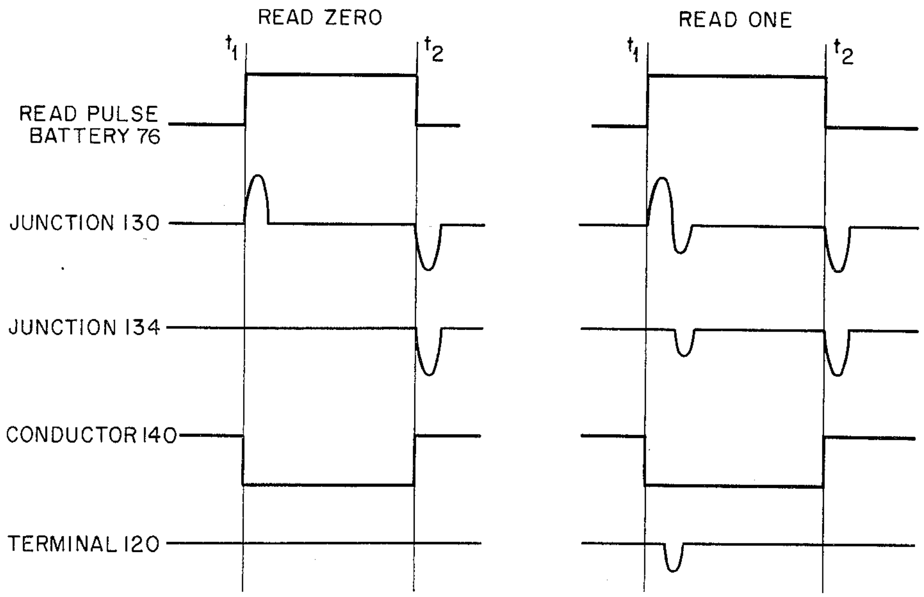

FIG. 12 graphically illustrates the pulse forms developed at different points in the circuit of FIG. 11 during a readout operation.

Figure 13:
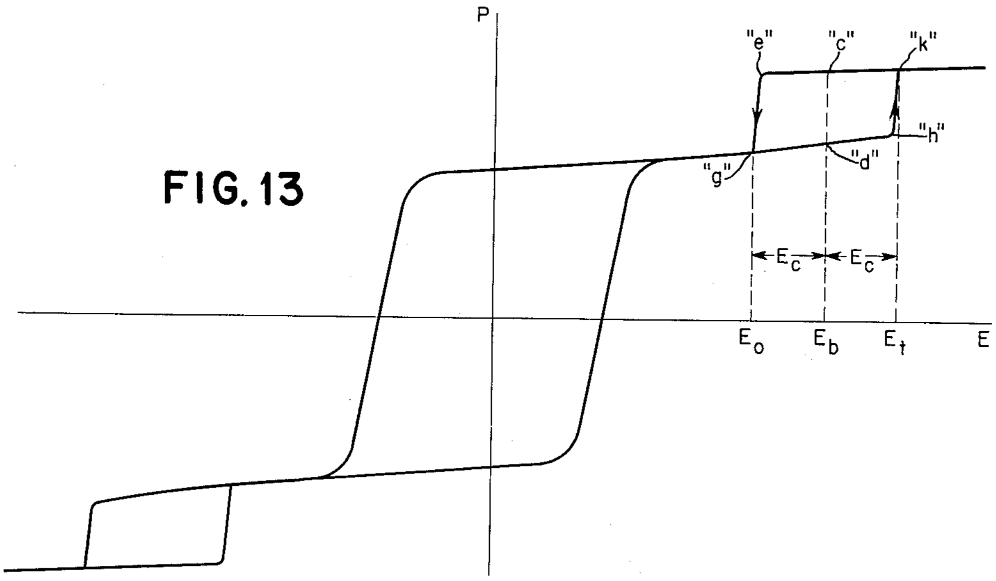

FIG. 13 shows a triple hysteresis loop typical of those obtained by subjecting a crystal of barium titanate to an alternating voltage while the crystal is maintained at a constant temperature in the vicinity of 5° C.

Figure 14:
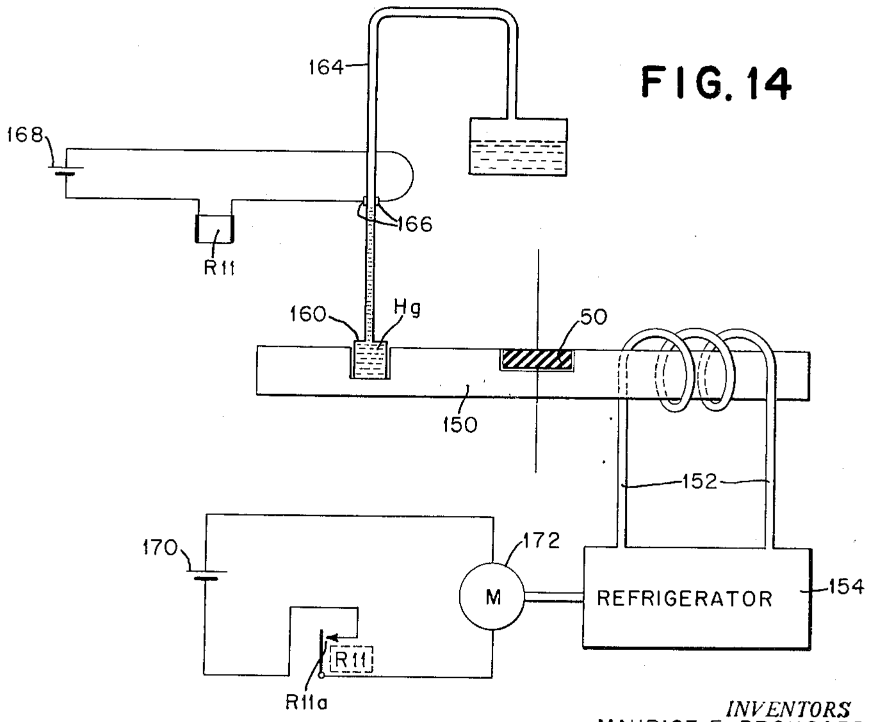

FIG. 14 diagrammatically illustrates a method of maintaining a barium titanate capacitor at a constant temperature in the vicinity of 5° C.

Figure 1:
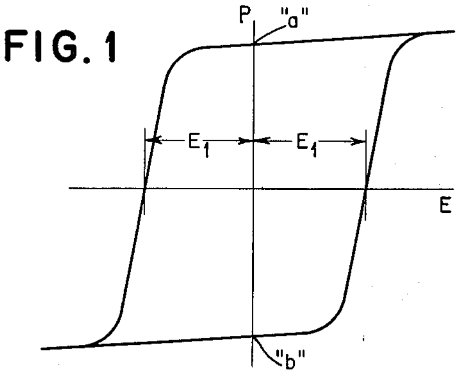
FIG. 1 is a plot of polarization versus applied voltage for a barium titanate crystal in the tetragonal state.
Figure 2:
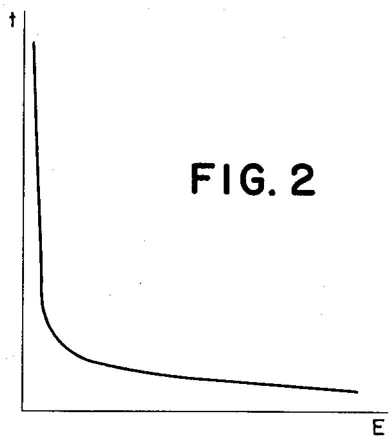
FIG. 2 is a plot of switching time versus applied voltage for a barium titanate crystal in the tetragonal state.

There is shown, in FIG. 1, a plot of polarization P versus applied voltage E typical of that obtained for crystals of barium titanate when operated in the temperature range from 5° C. to 120° C. Where such a capacitor is employed as the dielectric of a capacitor to be used to store binary information, each of the opposite states of remanent polarization at points "*a*" and "*b*" may be arbitrarily selected as representative of one or the other of the binary numerals one and zero. The point "*a*" is representative of a remanent polarization in one direction and the point "*b*" representative of polarization in an opposite direction. In order to reverse the direction of polarization in such a capacitor it is necessary to subject it to an applied voltage which is usually termed the coercive voltage, and which for the plot of FIG. 1 is in magnitude $E_1$ volts. However, it has been found that the coercive voltage is not precisely defined and, that, as illustrated in the diagram of switching time "*t*" versus applied voltage E shown in FIG. 2, the voltage required to reverse the polarization of a crystal is dependent upon the length of time it is applied. Thus, even a very small voltage will, if applied for a sufficient time, effect a reversal of polarization in the capacitor.

Figure 3:
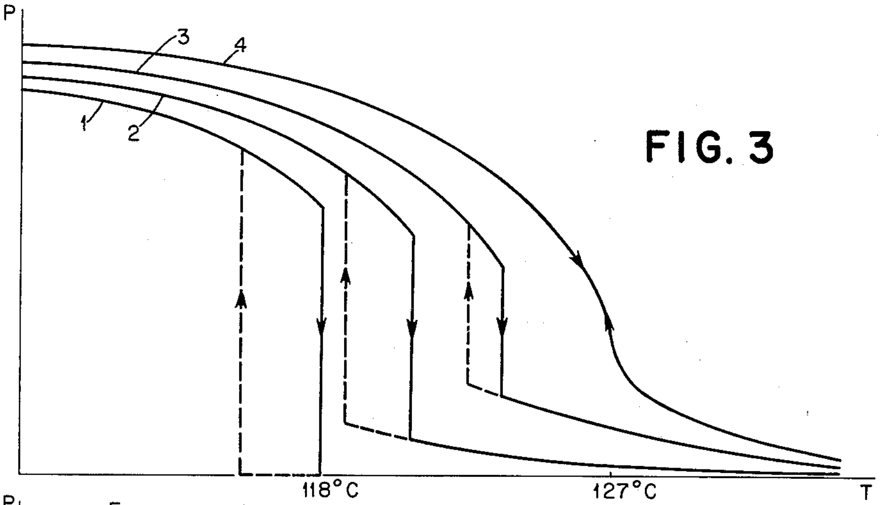
FIG. 3 shows the polarization-temperature characteristics for a barium titanate crystal subjected to different bias voltages.

The family of curves shown in FIG. 3 depicts the change in polarization effected in a particular crystal of barium titanate by changes in temperature when the crystal is subjected to applied voltages of different magnitude. The curve designated 1 represents the polarization-temperature characteristic with no voltage applied; the curves designated 2, 3, and 4 represent the same characteristic for applied voltages of $E_2$, $E_3$, and $E_4$ volts, respectively, where $E_2<E_3<E_4$. As shown by curve 1, the crystal with no voltage applied abruptly loses its remanent polarization at 118° which temperature is thus the Curie temperature for the crystal. As the bias voltage applied to the crystal is increased, the temperature at which this abrupt decrease in polarization occurs also increases, but, as shown by the curve designated 4, when the applied voltage is raised sufficiently high, the decrease in polarization is no longer abrupt but gradual. It should also be noted that in the temperature range from 118° C. to 127° C., which is the range in which this abrupt change in polarization occurs for applied voltages of 0, $E_2$, and $E_3$ volts, the characteristic curves are hysteretic in nature. Thus, whereas with no voltage applied the abrupt change in polarization occurs at 118° as the crystal is heated, a similar abrupt change will occur at a lower temperature as the crystal is cooled. This is indicated by the dotted portions of the curves shown with the arrows indicating the direction of temperature change. This hysteretic effect is not present in the curve 4 indicating that, where a sufficiently high voltage is applied to the crystal, the change in polarization in the Curie temperature range both on heating and cooling is continuous, whereas as indicated by the abrupt changes of curves 1, 2 and 3, the change in polarization, where the applied voltage is zero or sufficiently low, is discontinuous.

Figure 4A:
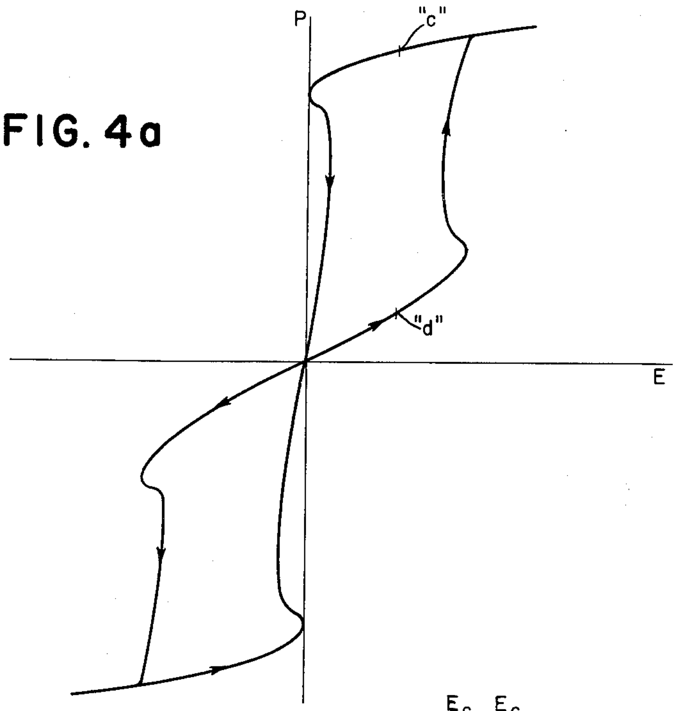
Figure 4B:
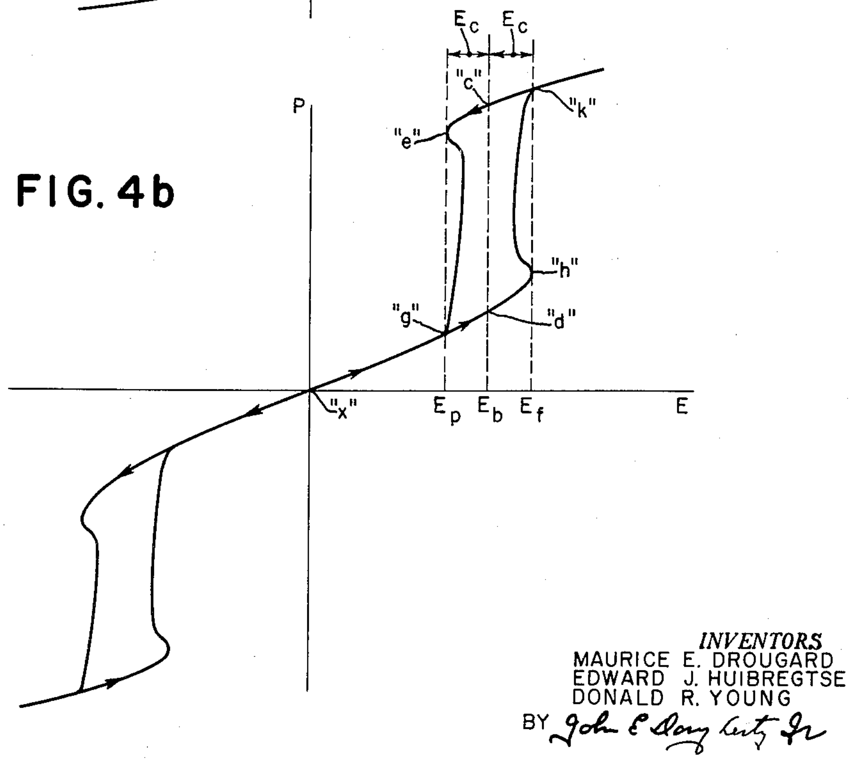
Figure 4C:
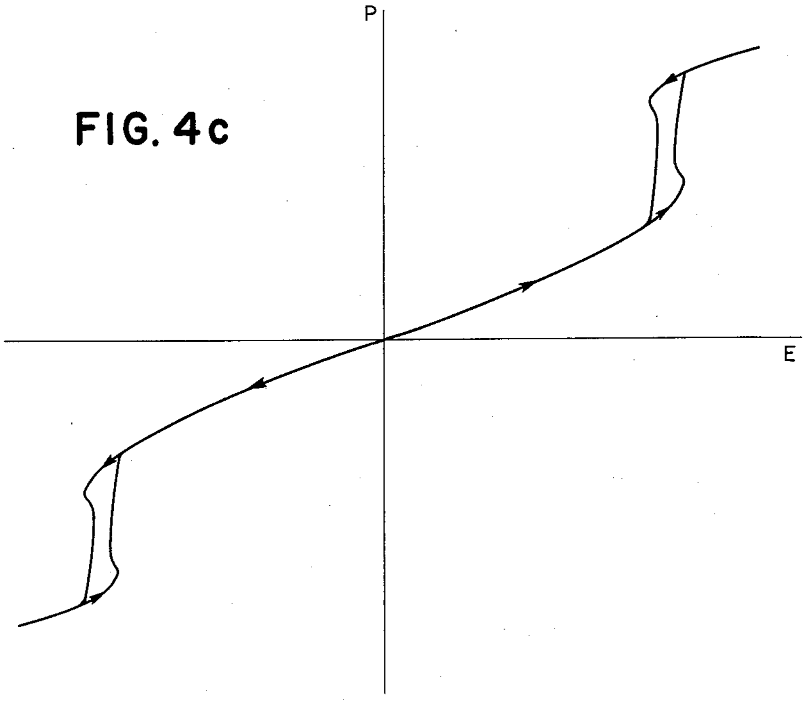
Figure 4D:
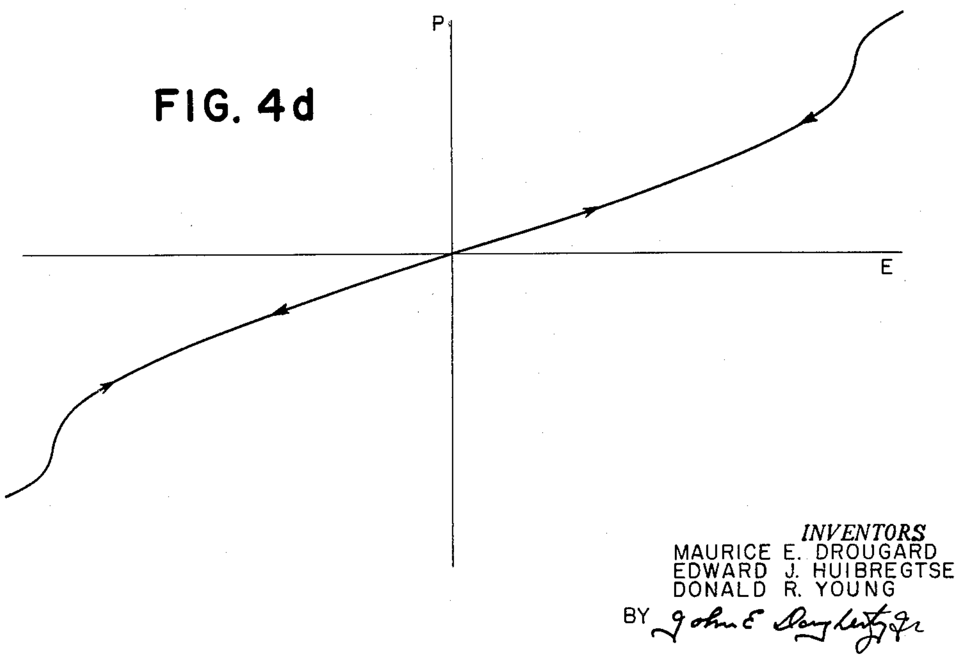

FIGS. 4*a*, 4*b*, 4*c* and 4*d* diagrammatically illustrate the plural hysteresis loops obtained when a crystal of barium titanate is held at a constant temperature within the range wherein a first order transistion in its lattice structure occurs and subjected to an alternating field of sufficient magnitude. The curve of FIG. 4*a* represents the polarization-voltage characteristic obtained at 118° C., the Curie temperature for a particular crystal tested, and the curves of FIGS. 4*b*, 4*c* and 4*d* represent the same characteristic at constant temperatures of 121° C., 124° C. and 127° C., respectively. As shown, the hysteresis loops become narrower and are spaced further apart as the temperature at which the crystal is maintained is raised, and at 127° C. the hysteresis loop disappears altogether. One significant characteristic here to be noted is that the knee of each loop is sharply defined and in fact the slopes become briefly negative as this portion of each loop is traversed. Further, the slopes of the horizontal portions of each loop are dissimilar, the dissimilarity being greatest for the loops obtained at the Curie temperature for the crystal and decreasing as the operating temperature is increased. For example, for the loop of FIG. 4*a* obtained at a temperature of 118° C., the dielectric constant at point "*c*" was found to be 7,000 and at point "*d*" 18,000; whereas for the loop of FIG. 4*b*, obtained at a temperature of 121° C., the dielectric constant at point "*c*" was found to be 12,000 and at point "*d*" to be 24,000. The narrower loops obtained at the higher temperatures may be advantageously applied in data storage systems since lower coercive voltages are required and the energy dissipated in traversing these loops is small. However, the greater dissimilarity in the slope of the horizontal portions of the loops obtained at lower temperatures is desirable in that it renders easier the accomplishing of nondestructive readout. In illustrating the invention by a description of a preferred embodiment, an operating temperature of 121° C. is chosen since at that temperature the hysteresis loop is relatively narrow and the dissimilarity in dielectric constants is appreciable.

In employing such a barium titanate crystal, maintained at a temperature of 121° C., as a storage element, a bias voltage, designated $E_b$ volts in FIG. 4*b*, is applied to the crystal. The points *"c"* and *"d"* which represents the two stable states of polarization, in which the crystal may exist for this bias voltage, are assigned the binary values zero and one, respectively. The bias voltage $E_b$ is chosen to be midway between the voltage at which transitions in the crystal occur. Thus, when the crystal is in the binary zero representing state at point *"c,"* an applied switching pulse of $-E_c$ volts will be effective to cause the loop to be traversed along the portion *"ceg,"* and, upon terminating of this pulse, the crystal assumes the binary one representing state at point *"d."* Similarly, when the crystal is in the binary one representing state at point *"d,"* an applied switching pulse of $+E_c$ volts will cause the loop to be traversed along the portion *"dhk,"* and, upon the termination of the pulse, the crystal assumes the binary zero representing state at point *"c."* Because of the very sharp knee of the loop, the magnitude of the voltage necessary to switch from one state of polarization to the other is precisely defined. No voltage less than this voltage, which is termed the coercive voltage, will be effective to switch the crystal from one state to the other, regardless of how long or how often applied. In some applications, of course, it might be deemed advisable to apply switching pulses slightly greater in amplitude than the coercive voltage $E_c$, thereby rendering less rigid the design requirements of the pulse supplying circuitry.

The portions *"eg"* and *"hk"* of the hysteresis loop are, as shown in FIG. 4*b*, almost vertical and these portions of the loop are traversed in an exceedingly short time, in the order of a fraction of a microsecond, which allows for very rapid switching of the capacitor from one stable state to the other. The rapidity of switching and the phenomenon of the two different stable states of polarization in the same direction may be better understood by a consideration of FIG. 5 which shows in detail the polarization-temperature characteristics for applied voltages of $E_p$, $E_b$ and $E_f$ volts. The three values of voltage chosen correspond to voltages similarly designated in FIG. 4*b* and all are within the voltage range in which the characteristic is hysteretic as was previously explained with reference to FIG. 3. The arrows on the curves in FIG. 5 indicate direction of temperature change for which the particular portions of the curves are representative. As there shown, the portion of the curve 10 representing the abrupt change in polarization in the crystal as it is heated when subjected to an applied voltage of $E_p$ volts, corresponds to the portion of the curve 14 representing the abrupt change in polarization in the crystal as it is cooled when subjected to an applied voltage of $E_f$ volts. These changes occur at a temperature of 121° C. and, in the case of curve 10, the abrupt decrease at this temperature is due to a transition in the lattice structure of the crystal from tetragonal (ferroelectric) to cubic (paraelectric). In the case of curve 14 the abrupt increase in polarization at 121° C. is due to a transition in the lattice structure from cubic (paraelectric) to tetragonal (ferroelectric). The large change in polarization experienced with these transitions may be said to be due to the fact that the material in the tetragonal state being ferroelectric has a spontaneous polarization characteristic, and in the cubic state being paraelectric is not capable of spontaneous polarization.

Strictly speaking the material can be said to be cubic only when there is no polarization present, that is at the point *"x"* in FIG. 5. The application of a polarizing field to a ferroelectric material at a temperature above its Curie temperature will begin to strain the crystal lattice back toward the structure in which it is said to be ferroelectric. Thus, when at point *"x"* in FIGS. 4*b* and 5, the material is cubic but as the voltage is raised causing the material to be polarized, as indicated by the portion *"xgdh"* of the curves of both figures, the lattice structure begins to be changed from cubic to tetragonal. However, the change is slight until the applied voltage is raised to a value of $E_f$ volts. At this point an abrupt transition to the tetragonal state occurs and coincidently the polarization is increased from that at point *"h"* to that at point *"k"* on both FIGS. 4*b* and 5. Similarly, when the voltage is lowered, a transition from tetragonal to cubic occurs when the voltage $E_p$ is reached and the polarization rapidly decreases to the lesser value at point *"g"* where the material is only slightly tetragonal. When the ferroelectric capacitor is operated with a bias potential of $E_b$ volts at this temperature and subjected to switching pulses of $\pm E_c$ volts, the material will be polarized to the point *"k"* or *"g"* according to the polarity of the $E_c$ pulse and upon its termination will return to the stable state *"c"* or *"d,"* again according to the polarity of the $E_c$ pulse. Since the lattice structure is primarily cubic when existing in a state of polarization at any point along the segment *"xgh"* of either figure, and tetragonal along the segment *"kce,"* and since the segment *"hk"* represents what is in essence a transition from the cubic to the tetragonal state and the segment *"eg"* a transition from the tetragonal to the cubic state, it is deemed sufficiently accurate for the purposes of this disclosure to refer to the point *"d"* as being representative of the stable state of polarization in the cubic or paraelectric state for a bias voltage of $E_b$ and to the point *"c"* as the stable state of polarization in the tetragonal or ferroelectric state for a bias voltage of $E_b$ volts.

Note should here be made of the fact that the plural hysteresis loop characteristic as well as the negative slope portion of the loop are more sharply defined and thus better suited for application in a storage device when the electrodes, plated or deposited on opposing surfaces of the crystal, cover all or substantially all of the area of these surfaces. This is due to the fact that where the electrodes cover only a small portion of the crystal surfaces to which they are connected, the crystal is in effect clamped which clamping varies to some degree the discontinuity of the transitions effected. The effect of clamping upon the transitions from one state to the other is discussed in an article by M. E. Drougard et al. appearing in the Physical Review, vol. 98, No. 4, pages 1010–1014, May 15, 1955. The amount of the area electroded has a more marked effect on the negative slope characteristic than on the plural hysteresis loop characteristic and the area electroded may be reduced to a point where the plural hysteresis loops observed have a positive slope at all points.

In order to utilize a barium titanate crystal as the dielectric in a memory capacitor operated in the above manner, it is of course necessary to provide a means of maintaining the crystal at the desired constant temperature, which for the illustrative embodiment being described is 121° C. FIG. 6 illustrates one method of maintaining the crystal at the desired temperature and as there shown the memory capacitor 50 is placed in an oven 52 which is heated by a heating coil 54. Coil 54 is connected in a series circuit which received its power from a battery 56. A bimetal thermostatic element 58 is designed to complete the series circuit when the temperature falls below the desired 121° C., thereby allowing current to then flow through the coil 54 to maintain the crystal at this temperature. Another method of temperature control is shown in FIG. 7 wherein the capacitor 50 is likewise placed in an oven which receives its heat from a heating coil 54. A battery 56 is provided to cause current to flow through a series circuit which includes the coil 54 and a pair of normally closed relay contacts R1*a*. A mercury temperature control unit is provided which consists of a pair of mercury sinks 60 and 62 connected by a tube 64 having a pair of electric contacts 66, which are in turn connected in series circuit with a relay R1 and a battery 68. The mercury sink 60 is, as shown, placed within the oven 52 and contains an amount of mercury which, when heated to a temperature of 121° C., rises sufficiently to complete a circuit between contacts 66 thereby causing relay R1 to be energized. Energization of relay R1 opens contacts R1*a* thus interrupting the current through the heating coil 54. If the temperature falls below 121° C. the mercury will contract sufficiently to allow the circuit through contacts 66 to be broken, thereby deenergizing relay R1. Deenergization of relay R1 causes contacts R1*a* to again close to complete a circuit through the coil 54 and thereby maintain the proper temperature. Where it is desired to maintain the crystal at a higher temperature, it is only necessary to displace some of the mercury from the sink 62 to sink 60, and conversely temperature control at a lower temperature may be accomplished by displacing mercury from the sink 60 to sink 62.

FIG. 8 shows one embodiment of the invention wherein a capacitor 50 having a barium titanate crystal as a dielectric is utilized as a memory element when maintained at a temperature of 121° C. The capacitor 50 is shown within a box 70 which diagrammatically represents means for maintaining the barium titanate at the desired temperature. The heating and temperature control means may be of the type above described with reference to FIGS. 6 and 7, or one of the many such devices known in the art to be capable of performing this function. The bias voltage is supplied by a battery 72 through a resistor 74 to one electrode of the capacitor 50. The other electrode is connected through a parallel connected resistor 86 and capacitor 87 to a suitable reference potential, the only requirement being that the battery and reference potential be effective conjunctively to apply to the capacitor a bias voltage of $E_b$ volts. In the embodiment shown the reference potential is chosen to be ground and the battery 72 having one of its terminals connected through a high resistance element 73 to ground is effective to supply the necessary bias potential $E_b$. With the voltage $E_b$ applied to the crystal it may exist in either of the states of polarization "*c*" or "*d*" in FIG. 4*b*. When it is desired to restore the capacitor to the zero representing condition anticipatory of memory operation, a switch 75 is closed thereby completing a circuit to a battery 76 which is then effective to supply through a resistor 78 a pulse of $+E_c$ volts. The application of this $+E_c$ pulse will increase the voltage across the crystal to $E_f$ volts which will cause the hysteresis loop, when the capacitor is initially in the tetragonal or ferroelectric state at point "*c*," to be traversed along the portion "*ck*" and, when the capacitor is initially in the cubic or paraelectric state at point "*d*," along the portion "*dhk*." In either case when the switch 75 is opened to terminate the pulse, the loop is traversed from "*k*" to "*c*," and the capacitor is in the zero representing state. When it is desired to write a zero in the capacitor it is, of course, not necessary to apply any write pulse thereto. In order to write a binary one in the capacitor, a switch 80 is closed completing a circuit to a battery 82 which is then effective to supply through a resistor 84 a write pulse of $-E_c$ volts. The application of this write pulse reduces the potential drop across the capacitor 50 to $E_p$ volts thereby causing the hysteresis loop of FIG. 4*b* to be traversed along the portion "*ceg*," and, upon the termination of the pulse, to point "*d*," which point is, as previously mentioned, representative of a binary one.

When it is desired to read out information from the capacitor, the switch 75 is closed to apply a pulse of $+E_c$ volts. The application of this pulse, as above explained, increases the potential drop across the capacitor from $E_b$ to $E_f$ volts causing the hysteresis loop to be traversed either along the segment "*ck*" or the segment "*dhk*," according to the original state of polarization in the capacitor 50. Upon termination of the read pulse the loop, in either case, is traversed to point "*c*" representative of a binary zero. The capacitor 87 is connected in series with the capacitor 50 and an output terminal 88 is connected to a junction 89 between the capacitor 50 and the capacitor 87. The capacitance presented by the memory capacitor 50 to the read pulse is proportional to the slope of the portion of the hysteresis loop traversed upon application of the pulse. When a read pulse is applied from battery 76 to the capacitor 50 in the binary zero representing state, the segment "*ck*" is traversed and the capacitor 50 presents a low capacitance to the read pulse. As a result the pulse appears principally across the capacitor 50 and the pulse then developed at output terminal 88 is of relatively small magnitude. When a read pulse is applied to the capacitor in the binary one representing state, the segment "*dhk*" is traversed and the capacitor presents a high capacitance to the read pulse causing the pulse to then appear principally across the capacitor 87 and a relatively large and easily distinguishable pulse to be then developed at terminal 88.

Another embodiment of the invention is illustrated in FIG. 9 which figure depicts circuitry similar to that shown in FIG. 8 with the addition of a fourth voltage source designated 90. The operation of the circuit of FIG. 9 is the same as that of FIG. 8 for initially restoring the capacitor to the binary zero state and for writing information in the capacitor. The readout operation described with reference to FIG. 8 is what is termed a destructive readout in that, in order to read information out of the memory capacitor, it is necessary in each case to restore the capacitor 50 to the binary zero representing state thereby destroying the information previously stored therein. The readout pulses for the circuit of FIG. 9 are supplied by the battery 90 which, upon closing of a switch 94, is effective to apply through a resistor 92 a pulse in magnitude less than $E_c$ volts and thus insufficient to switch the capacitor from one state of polarization to the other. The pulse may be of either polarity, and in the present case a positive pulse is applied which pulse is effective, when the capacitor 50 is at point "*c*" storing a binary zero, to cause the loop to be traversed along a portion of the segment "*ck*"; and when the capacitor 50 is at point "*d*" storing a binary one, to cause the loop to be traversed along a portion of the segment "*dh*." The slope of these segments is different, the slope of the segment "*ck*" being less than that of the segment "*dh*." Since the slope of the portions of the loop traversed differ according to the information stored, the capacitance presented by capacitor 50 to the read pulse also differs. This difference in capacitance and, thus, difference in impedance, causes a pulse of greater amplitude to be developed at terminal 88 when the capacitor 50 is in the binary one condition than is there developed when the capacitor is in the binary zero condition. The choice of a read pulse of positive polarity is advantageous in that the slope of the segment "*eck*" decreases with increased voltage whereas the slope of the segment "*gdh*" increases with increased voltage. Thus, the difference in the capacitance presented, according to whether the capacitor is storing a binary one or a binary zero, is greater when a positive read pulse is applied than would be the case if a negative read pulse was applied. The problem of distinguishing the output pulses developed at terminal 88 is, therefore, simpler when positive read pulses are supplied. Since the read pulses are in magnitude less than the coercive voltage, the capacitor will return to its original state of storage upon termination of a read pulse, and the readout operation may be termed nondestructive. Also since the coercive voltage is precisely defined and there is, therefore, no walking, the capacitor 50 can be interrogated any number of times in this manner without disturbing the information stored therein.

Figure 10:
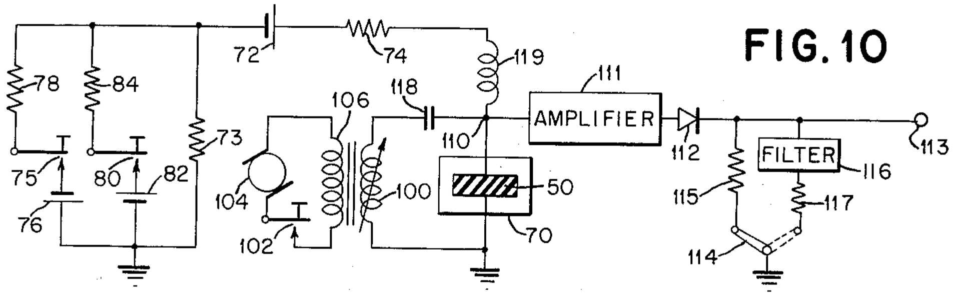

A further embodiment of the invention is shown in FIG. 10, wherein, in the manner described above with reference to FIG. 8, the battery 72 is effective to apply a bias voltage of $E_b$ volts to capacitor 50, and by selectively closing the switches 75 and 80, the capacitor is caused to assume the stable states of polarization at points "*c*" and "*d*" of FIG. 4*b*. Interrogation of the memory capacitor 50 is here accomplished by a tuned circuit comprising a variable inductance element 100 and the capacitor 50. Since the capacitance presented by capacitor 50 to an applied voltage is different when in the polarization state "*c*" than when in the polarization state "*d*," the resonant frequency of this tuned circuit is dependent upon the information stored in the capacitor. The readout voltage is supplied, upon the closing of a switch 102, by a generator 104 which applies across an inductor 106 an alternating voltage in the radio frequency range. The inductor 106 forms with the variable inductance element 100 a transformer, and according to the type of output desired, the inductance of element 100 is set so that the tuned circuit is resonant for the applied radio frequency either when the capacitor 50 is in the binary one representing condition at point "*d*" of FIG. 4*b*, or when at the binary zero condition at point "*c*" of that figure. The readout operation is here nondestructive in that the amplitude of the radio frequency wave applied to the capacitor 50 is less than the coercive voltage $E_c$ for the crystal and the application of this alternating voltage, when the capacitor 50 is in the binary zero representing condition, causes the loop to be traversed back and forth along the portion "*eck*," and, when in the binary one representing condition, along the segment "*gdh*." The inductance of element 100 is, in the illustrative embodiment, set so that the circuit formed by capacitor 50 and this inductor is resonant at the applied readout frequency when the capacitor 50 is in the binary one condition at point "*d*" of FIG. 4*b*. Thus, when a binary one is stored in the capacitor, the closing of switch 102 will cause an alternating voltage having an appreciable amplitude to be developed at a junction 110 between an output amplifier 111 and the capacitor 50. This amplifier 111 amplifies this voltage and applies it to a crystal diode 112 which serves as a half wave rectifier. The actual output developed at an output terminal 113 is dependent upon the position of a switch 114. With the switch in the condition shown in full lines, the output is developed across a resistor 115 and appears at terminal 113 as a unidirectional oscillating voltage. When the switch is in the dotted position the output is developed across a filter 116 and resistor 177 and appears as a steady voltage at terminal 113. It should be noted that the state of the capacitor is continuously manifested at terminal 113 as long as the switch 102 is kept closed and that the operation does not destroy the information stored in the capacitor. Similarly when switch 102 is closed and then opened to produce a readout, the operation is nondestructive and the output at terminal 113 is, when switch 114 is in the position shown dotted, in the form of a pulse, the duration of which is dependent upon how long switch 102 remains closed.

The memory circuit of FIG. 10 may be operated with the switch 102 closed, in which case an output will continuously appear at terminal 113 when the capacitor 50 is storing a binary one and no output will appear when the binary zero is stored in the capacitor. When so operated the switches 75 and 80 may be selectively operated to restore and write information in the capacitor 50. A capacitor 118 having a large capacitance is connected between junction 110 and inductor 100 to prevent the switching pulses from being transmitted back to the alternating voltage source 104. Similarly a radio frequency choke in the form of coil 119 is connected between terminal junction 110 and resistor 74 to prevent the radio frequency readout voltage from being transmitted back to the switching pulse sources.

The circuit of FIG. 10 might also be considered as a gate circuit or a flip flop circuit. When considered as a gate, the inductor 100 is, for example, set so that the tuned circuit is resonant at the applied frequency when the capacitor 50 is in the condition "*d*" of FIG. 4*b*. In such a case, the gate circuit is closed as long as the capacitor is in the stable state at point "*c*" and is opened by the closing of switch 82 to cause the loop to be traversed along the portion "*ceg*," and then, upon opening of this switch to point "*d*." Since the point "*d*" is a stable state, the gate will remain open until the switch 76 is closed to cause the capacitor to assume its other stable state at point "*c*." When the capacitor is at point "*d*" and switch 102 is closed, an alternating voltage will appear at junction 110, and either an oscillating unidirectional voltage or a steady voltage level at terminal 113 according to the position of switch 114.

With the switch 102 kept closed and the switch 114 in the dotted position, the circuit of FIG. 10 may be considered as a flip flop or trigger circuit which is flipped from one stable state to the other by alternately closing switches 75 and 80 to thereby apply successive pulses of opposite polarity to capacitor 50. When capacitor 50 is in the stable state at point "*d*" of FIG. 4*b* following the application of a positive pulse from battery 76, a steady voltage is developed at terminal 113, and, when in the stable state at point "*c*" of FIG. 4*b*, terminal 113 remains at the reference potential to which switch 114 is connected, which is, in the illustrative embodiment, ground potential.

Another embodiment of the invention is shown in the circuit of FIG. 11. The restoring and writing operations of this circuit are the same as described with reference to FIG. 8. In the circuit of FIG. 11, the bias voltage $E_b$ applied by battery 72 to capacitor 50 is negative but this voltage is applied to the other terminal of capacitor 50 so that the stable states of polarization again exist at points "*c*" and "*d*" of FIG. 4*b*. As in FIG. 8, the closing of switch 75 to apply a pulse of $+E_c$ volts to the capacitor is effective to increase the voltage across the capacitor to $E_f$ volts and thereby restore it to the binary zero representing condition at point "*c*" and the closing of switch 80, to apply a negative pulse of $E_c$ volts, is effective to reduce the drop across the capacitor to $E_p$ volts thereby causing the loop to be traversed to the binary one representing condition at point "*d*." The closing of switch 75 is also effective as before to cause information stored in the capacitor to be read therefrom, the output pulse being developed at an output terminal 120. Terminal 120 is connected through a gate 121, a diode 122 and a differentiating circuit comprising a capacitor 124 and resistor 126 to a junction 128 to which the read pulse of $+E_c$ volts is applied. As before stated, the application of the read pulse, when the capacitor 50 is in the binary zero representing condition at point "*c*" of FIG. 4*b*, causes the loop to be traversed along segment "*ck*," and, when the capacitor is in the binary one representing state at point "*d*," along the segment "*dhk*." In the latter case a portion of the segment traversed has a negative slope. Since the capacitance presented by the capacitor is proportional to the slope of the polarization-voltage characteristic, the capacitor, when it is initially in the binary one representing condition, briefly presents a negative capacitance to the read pulse.

The pulses developed at the various junctions in the output circuit upon the application of a read pulse are shown in FIG. 12. When the capacitor is in the binary zero representing condition, no negative capacitance is presented to the read pulse which, as shown in FIG. 11, extends from time $t_1$ to time $t_2$, where $t_1$ corresponds to the time at which switch 75 is closed and $t_2$ the time at which it is opened. The differentiating circuit comprising capacitor 124 and resistor 126 is effective to differentiate the leading and trailing edges of the read pulse producing the positive and negative pulses shown at a junction 130 between capacitor 124 and rectifier 122. The diode 122 presents a high impedance to the positive pulse and a low impedance to the negative pulse developed at junction 130 and, thus, it is only the latter pulse which is effective to cause any appreciable current flow through a resistor 132 connected to a junction 134 between diode 122 and gate 121. Thus, as shown in FIG. 11, when a binary zero is being read out, a single negative pulse appears at junction 134 which pulse, being produced by the trailing edge of the read pulse, occurs after $t_2$ time. The gate 121 is normally closed, but when switch 75 is closed a positive pulse is transmitted on a lead 136 to an inverter 138 which inverts the pulse and applies it through a lead 140 to gate 121. This pulse opens gate 121 from $t_1$ to $t_2$ time, however, since the single pulse developed at junction 134 when a binary zero is read out, occurs after $t_2$ time, no pulse is developed at output terminal 120. When the capacitor 50 is in the binary one representing condition, the leading edge of the read pulse applied causes the loop to be traversed along segment *"dhk."* As the portion *"dh"* is traversed a positive pulse is produced as before at junction 130, however, as the portion *"hk"* is traversed a negative capacitance is briefly presented and a negative voltage pulse is developed at junction 130. The trailing edge of the read pulse, which causes the segment *"kc"* to be traversed, produces, after $t_2$ time, a negative pulse at terminal 130. The rectifier 122 allows only the negative pulses to appear at junction 134 and, since gate 121 is open from $t_1$ to $t_2$ time, only the first of the two negative pulses appears at output terminal 120. Thus, where a binary zero is stored in the capacitor the application of a read pulse produces no output at terminal 120, and, when a binary one is stored, an output pulse appears at this terminal.

FIG. 13 is a plot of polarization versus applied voltage for a crystal of barium titanate held at a temperature of 4° C. Barium titanate, as previously mentioned, undergoes a transition from the tetragonal to the orthorhombic state at approximately 5° C. The transition is first order and, when the material is subjected to a bias voltage as it is cooled, the temperature at which the transition occurs is lowered. As in the tetragonal to cubic transition, the polarization-temperature characteristic is hysteretic, occurring at one temperature when the material is cooled and at a higher temperature when the crystal is heated. The temperature range in which this hysteresis appears varies for different crystals and, for one particular crystal tested for which the transition with no applied voltage occurred at 6° C., the temperature hysteresis range was about 6° C.

The transition, with cooling, is from tetragonal to orthorhombic and, with heating, is orthorhombic to tetragonal. Barium titanate is ferroelectric in both states, but in the tetragonal state the coercive voltage necessary to switch from one state to the other and the spontaneous polarization of the material are greater than in the orthorhombic state. This characteristic, and the above mentioned hysteretic temperature characteristic at the transition temperature, cause the material to exhibit the triple hysteresis loop, shown in FIG. 13. The middle loop represents the hysteresis loop in the orthorhombic state and, as the voltage and thus the applied electric field is increased, a transition from the orthorhombic to the tetragonal state occurs at an applied voltage of $E_t$ volts.

Note should here be made of the fact that the direction of spontaneous polarization in a crystal of barium titanate is diffferent in the different crystalline states and that, though that physical mechanism which is a characteristic of a material capable of spontaneous polarization is usually associated with the ability to retain polarization in the absence of an electric field, this same characteristic can be and is considered as a component of the total polarization in the material when subjected to an electric field. When in the cubic state barium titanate being paraelectric, there is, of course, no spontaneous polarization and any polarization effected by an applied voltage will, of course, be in a direction normal to the substantially parallel flat surfaces of the crystal to which the electrodes, in the embodiments herein disclosed as illustrating the invention, are connected. In the tetragonal state the direction of spontaneous polarization is normal to the electroded surfaces, whereas in the orthorhombic state the direction of polarization is at an angle to these surfaces. Thus, the application of a voltage to the electroded flat surfaces of a crystal in the tetragonal state increases the polarization in the same direction, whereas the application of a voltage to the same electroded surfaces of a crystal in the orthorhombic state tends to rotate the direction of polarization already existing in the material. The abrupt increase in polarization which occurs upon a transition from the orthorhombic to tetragonal state may be said to be due to the fact that the effective spontaneous polarization in the material, which is the component of this polarization in the direction normal to the electroded surfaces of the crystal, is greater in the tetragonal state than in the orthorhombic state. As the voltage is decreased, the transition back to the orthorhombic state occurs at $E_0$ volts. A similar loop is observed in the third quadrant and it should be noted that as the temperature at which the material is maintained is lowered the outer loops are displaced further from the middle loop and a larger voltage is required to cause a transition from the orthorhombic to the tetragonal state. As with the double loops observed near the higher transition temperature, the slopes of the horizontal portions of each loop differ, the difference being greater for temperatures near the transition temperature. Also as with the high temperature transition, the transition from one state to the other is extremely fast and the transition is more sharply defined if the electrodes cover all or substantially all of the surfaces of the crystal and the crystal is thus in a substantially unclamped condition.

A capacitor having a crystal of barium titanate maintained at a temperature near that at which it undergoes a transition from the tetragonal state to the orthorhombic state may be used as a memory element in circuitry similar to that described with reference to the operation at the higher transition temperature. The bias voltage is as before designated $E_b$ volts, it being understood that the proper bias voltage increases as the operating temperature decreases. It should also be noted that the bias voltage in the lower temperature range in the vicinity of 5° C., is higher than that required in the higher temperature range in the vicinity of 120° C. The polarization state *"d"* in FIG. 13 is assigned as the binary one representing condition and the state *"c,"* the binary zero representing condition. The larger polarization at point *"c"* is due to the increase in the effective spontaneous polarization in the material when it is switched from the orthorhombic to the tetragonal state. As before the slopes of the portions of the loops traversed, upon the application of a pulse to the capacitor, are proportional to the capacitance which the capacitor represents to the pulse. Thus, it may be seen that a capacitor maintained at a temperature at or below its transition temperature may be utilized in the memory circuit in FIG. 8. In such an application, the box 70 in FIG. 8 represents means for maintaining the capacitor at the desired temperature in the vicinity of 5° C. and the voltage supplied by the batteries 72, 76 and 82 correspond to the values of $E_b$, $+E_c$ and $-E_c$, respectively, as shown in FIG. 13. Since the difference in the slopes of the horizontal portions of the loop differ, the slope of the segment *"gdh"* being greater than that of segment *"eck,"* a capacitor maintained in the lower temperature transition range may also be utilized as a memory element in the circuits of FIG. 9 and FIG. 10, the box 70 in each figure then being representative of means for maintaining the crystal at the proper temperature in the vicinity of 5° C. In utilizing such a capacitor in the circuit of FIG. 9, the voltages applied by the batteries 72, 76 and 82 correspond to the voltages $E_b$, $+E_c$ and $-E_c$, respectively, as shown in FIG. 13 and the voltage applied by battery 90 is less than the coercive voltage $E_c$ for the loop of this figure. Similarly, where such a capacitor is incorporated in the circuit of FIG. 10, the box 70 represents means for maintaining the crystal at the desired temperature in the vicinity of 5° C. and the batteries 72, 76 and 82 supply voltages $E_b$, $+E_c$ and $-E_c$, respectively, corresponding to the voltages as shown for the loop of FIG. 13. Note should be made of the fact that the pulses developed at the output terminal in each of these circuits differ according to the slope of the portions of each loop traversed on readout and, though in each case the pulses are distinguishable, the ratio of the amplitude of the output pulse for a binary one readout to the amplitude of an output pulse for a binary zero readout differs according to the ratio of the capacitances for each loop.

FIG. 14 shows one method of maintaining a capacitor, having a barium titanate crystal as a dielectric, at a constant temperature in the vicinity of 5° C. As there shown, the capacitor 50 is placed in heat transfer contact with a cold plate 150 which is cooled to the desired temperature by a coil 152 through which is passed a cooling liquid from a refrigerating unit 154. Temperature control is effected by a mercury relay of the type previously described with reference to FIG. 7. One sink 160 of the relay is placed in heat transfer contact with plate 150 and the amount of mercury placed in this sink is such that, when the temperature of the cold plate 150 rises above the desired temperature, the mercury will expand to close the contacts 166 in tube 164. Closing of these contacts completes a series circuit from a battery 168 through the coil of a relay R11. Energization of this relay closes a pair of associated contacts R11*a*, which contacts when closed complete a circuit from a battery 170 to energize a motor 172 which drives the refrigerating unit 154.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a data storage system, a capacitor having as a dielectric a body of material capable of existing in a plurality of crystalline states at the same temperature, said material having a spontaneous polarization characteristic in at least one of said crystalline states, means for maintaining said material at a substantially constant temperature at which it is capable of existing in at least a first and a second crystalline state, said material having a spontaneous polarization characteristic in at least one of said first and second states, means for maintaining said capacitor biased at a potential at which said material is capable of existing in said first and said second crystalline states at said substantially constant temperature, means for applying to said capacitor pulses of a polarity and magnitude effective when said material is in said first crystalline state to cause a transition to said second crystalline state, said pulse applying means including means for applying to said capacitor pulses of a polarity and magnitude effective when said material is in said second crystalline state to cause a transition to said first crystalline state, and means for detecting when said applied pulses are effective to cause a transition in said material from one of said crystalline states to the other.

2. In a data storage system, a crystal of a material capable of existing in a first and in a second crystalline state at a particular temperature, a pair of electrodes each connected to a surface of said crystal and each covering substantially all of the surface to which it is connected, means for maintaining the temperature of said material substantially constant at said particular temperature, means coupled to said electrodes maintaining said material biased at a potential at which it is capable of existing stably in said first and in said second crystalline state at said particular temperature, means coupled to said electrodes for applying pulses of a polarity and magnitude effective when said material is in said first stable state to switch said material to said second stable state, means coupled to said electrodes for applying pulses of a polarity and magnitude effective when said material is in said second stable state to switch said material to said first stable state, the polarization voltage characteristic of said biased material defining the change in polarization therein when said material is switched back and forth between said stable states being in the form of a hysteresis loop, and means coupled to at least one of said electrodes for detecting when one of said pulses is effective to switch said material from one of said stable states to the other.

3. In a data storage system, a pair of electrodes dielectrically coupled by a body of a material capable of existing in a first and in a second crystalline state at a particular temperature, said material having a spontaneous polarization characteristic in at least one of said crystalline states, means maintaining the temperature of said crystal substantially constant at said particular temperature, means maintaining said material electrically biased in a condition in which it is capable of existing in said first and said second crystalline states at said particular temperature, means for applying to said material an electric field of a polarity and magnitude effective when said material is in said first crystalline state to cause a transition in said material to said second crystalline state, said field applying means being also effective to apply to said material an electric field of a polarity and magnitude effective when said material is in said second crystalline state to cause a transition in said material to said first crystalline state, and means for detecting when one of said applied electric fields is effective to cause a transition in said material from one of said crystalline states to the other.

4. In a data storage system, a crystal of a material capable of existing in a ferroelectric and in a paraelectric state at a particular temperature, a pair of electrodes each connected to a different face of said crystal and each covering substantially all of the face to which it is connected, means for maintaining the temperature of said material substantially constant at said particular temperature, means coupled to said electrodes for maintaining said material biased at a potential at which it is capable of existing stably in each of said states at said particular temperature, means coupled to said electrodes for applying a pulse of a polarity and magnitude effective when said material is in said stable paraelectric state to switch said material to said ferroelectric state, said pulse applying means being also effective to apply a pulse of a polarity and magnitude effective when said material is in said stable ferroelectric state to switch said material to said paraelectric state, and means coupled to at least one of said electrodes for detecting when one of said pulses is effective to switch said material from one of said stable states to the other.

5. In a data storage system, a crystal of a material capable of existing in a first and in a second ferroelectric state at a particular temperature, a pair of electrodes connected to substantially parallel opposite faces of said crystal, said material when in said first state having a spontaneous polarization characteristic in a direction having a first angular relationship to said faces and when in said second state having a spontaneous polarization characteristic in a direction having a different angular relationship to said faces, means for maintaining the temperature of said material substantially constant at said particular temperature, means coupled to said electrodes for electrically biasing said material at a potential at which said material is capable of existing stably in said first and in said second state at said particular temperature, means for applying to said electrodes a pulse of a polarity and magnitude effective when said material is in said first stable state to switch said material to said second stable state, said pulse applying means being also effective to apply to said electrodes a pulse of a polarity and magnitude effective when said material is in said second stable state to switch said material to said first stable state, and means coupled to at least one of said electrodes for detecting when one of said pulses is effective to switch said material from one of said stable states to the other.

6. The invention as claimed in claim 5 wherein each of said electrodes covers substantially all of the face to which it is connected.

7. A circuit device comprising a substantially unclamped body of material having a pair of electrodes thereon, said material being capable of existing in a first and in a second crystalline state at a particular temperature and having a spontaneous polarization characteristic in at least one of said states, means for maintaining the temperature of said material substantially constant at said particular temperature, and means coupled to said electrodes for maintaining said material biased at a potential at which said material is capable of existing stably in each of said states at said particular temperature and for switching said material maintained at said particular temperature between said first and second stable states.

8. In a data storage system, a capacitor having as a dielectric a body of a material capable of existing in a first and in a second crystalline state at a particular temperature, means maintaining the temperature of said material substantially constant at said particular temperature, means maintaining said capacitor biased at a potential at which said material is capable of existing stably in said first and in said second state at said particular temperature, means for applying to said capacitor a pulse of a polarity and magnitude effective when said material is in said first stable state to switch said material to said second stable state, said pulse applying means being also effective to apply to said capacitor a pulse of a polarity and magnitude effective when said material is in said second stable state to switch said material to said first stable state, means for applying to said capacitor an interrogation pulse of insufficient magnitude to switch said capacitor from one of said stable states to the other, said capacitor when in said first stable state having a first dielectric constant and presenting a first capacitance to said interrogation pulse and when in said second stable state having a different dielectric constant and presenting a different capacitance to said interrogation pulse, and means coupled to at least one electrode of said capacitor for detecting whether said capacitor presents said first or said different capacitance to said interrogation pulse.

9. In a data storage system, a capacitor comprising a crystal of a material capable of existing in a ferroelectric and in a paraelectric state at a particular temperature and a pair of electrodes each connected to a different face of said crystal, means for maintaining the temperature for said material substantially constant at said particular temperature, means coupled to said electrodes for maintaining said material biased at a potential at which said material is capable of existing stably in each of said states at said particular temperature, means for applying to said electrodes a pulse of a polarity and magnitude effective when said material is in said stable paraelectric state to switch said material to said ferroelectric state, means for applying to said electrodes a pulse of a polarity and magnitude effective when said material is in said stable ferroelectric state to switch said material to said paraelectric state, means for applying to said electrodes an interrogation pulse of insufficient magnitude to switch said capacitor from one of said stable states to the other, said material when in said paraelectric state having first dielectric constant and presenting a first capacitance to said interrogation pulse and when in said ferroelectric state having a different dielectric constant and presenting a different capacitance to said interrogation pulse, and means coupled to at least one of said electrodes for detecting whether said material presents said first or said different capacitance to said interrogation pulse.

10. In a data storage system, a capacitor comprising a crystal of a material capable of existing in a first and in a second ferroelectric state at a particular temperature and a pair of electrodes connected to substantially opposite faces of said crystal, said material when in said first state having a spontaneous polarization characteristic in a direction having a first angular relationship to said faces and when in said second stable state having a spontaneous polarization characteristic in a direction having a different angular relationship to said faces, means maintaining the temperature of said material substantially constant at said particular temperature, means maintaining said electrodes biased at a potential at which said material is capable of existing stably in said first and in said second state at said particular temperature, means for applying to said electrodes a pulse of a polarity and magnitude effective when said material is in said first stable state to switch said material to said second state, said pulse applying means being also effective to apply to said electrodes a pulse of a polarity and magnitude effective when said material is in said second stable state to switch said material to said first state, means for applying to said capacitor an interrogation pulse of insufficient magnitude to switch said capacitor from one of said stable states to the other, said capacitor when in said first stable state having a first dielectric constant and presenting a first capacitance to said interrogation pulse and when in said second stable state having a different dielectric constant and presenting a different capacitance to said interrogation pulse, and means coupled to at least one electrode of said capacitor for detecting whether said capacitor presents said first or said different capacitance to said interrogation pulse.

11. In a memory system, a capacitor having as a dielectric a body of a material capable of existing in a first and in a second crystalline state at a particular temperature, means maintaining the temperature of said material substantially constant at said particular temperature, means maintaining said capacitor biased at a potential at which said material maintained at said particular temperature is capable of existing stably in said first and in said second state and capable of being switched back and forth between said states, the polarization of said material when in said first stable state at said bias potential being different than the polarization of said material when in said second stable state at said bias potential, the voltage polarization characteristic of said biased capacitor defining the change in polarization therein when said material is switched back and forth between said first and second stable states being in the form of a hysteresis loop, the slope of the side portions of said loop being different than the slopes of the top and bottom portions thereof, the slope of the top portion of said loop different than the slope of the bottom portion thereof, means for applying an interrogation signal to said capacitor, and means coupled to said capacitor and responsive according to the capacitance presented by said capacitor to said interrogation signal for manifesting the state of said capacitor.

12. The invention as claimed in claim 11, wherein said manifesting means comprises an impedance element coupled to said capacitor.

13. The invention as claimed in claim 11, wherein said manifesting means comprises an impedance element connected in series circuit relationship with said capacitor and an output terminal coupled to a junction between said capacitor and said impedance element.

14. In a memory system, a capacitor comprising a crystal of material capable of existing in a first and in a second crystalline state at a particular temperature and a pair of electrodes connected to substantially parallel opposite faces of said crystal, each of said electrodes covering substantially all of the face to which it is connected, means maintaining the temperature of said material substantially constant at said particular temperature, means coupled to said electrodes maintaining said capacitor biased at a potential at which said material maintained at said particular temperature is capable of existing stably in said first and in said second state and capable of being switched back and forth between said states, the voltage polarization characteristic of said biased capacitor maintained at said particular temperature being in the form of a hysteresis loop, the slope of the side portions of said loop being different than the slopes of the top and bottom portions thereof, the slope of the top portion of said loop being different than the slope of the bottom portion thereof, means for applying an interrogation signal to said capacitor, and means coupled to said capacitor and responsive to the capacitance presented by said capacitor to said interrogation signal for manifesting the state of said capacitor.

15. In a memory system, a capacitor comprising a crystal of material capable of existing in a first and in a second crystalline state at a particular temperature and a pair of electrodes connected to substantially parallel opposite face of said crystal, each of said electrodes covering substantially all of the face to which it is connected, means maintaining the temperature of said material substantially constant at said particular temperature, means maintaining said capacitor biased at a potential at which said material maintained at said particular temperature is capable of existing stably in said first and in said second state and capable of being switched back and forth between said states, the polarization of said material when in said first stable state at said bias potential being different than the polarization of said material when in said second stable state at said bias potential, the voltage polarization characteristic of said biased capacitor defining the change in polarization therein when said material is switched back and forth between said first and second stable states being in the form of a hysteresis loop, the portion of said loop traversed when said material is switched from said first to said second state including a segment having a negative slope, means coupled to said capacitor for applying thereto an interrogation pulse of a polarity and magnitude effective when said material is in said first stable state to switch said material to said second stable state, means coupled to said capacitor responsive according to the capacitance presented by said capacitor to said interrogation pulse for detecting when said pulse is effective to cause a traversal of said negative slope segment of said loop.

16. The invention as claimed in claim 15, wherein said detecting means include a differentiating circuit connected in parallel circuit relationship with said capacitor.

17. The invention as claimed in claim 16, wherein said detecting means include gating means coupled to said differentiating circuit, and means for gating said gating means for the duration of said interrogation pulse.

18. The invention as claimed in claim 16, wherein said detecting means include a rectifying element connected to said differentiating circuit, gating means coupled to said rectifying element, and means coupling said gating means and said pulse applying means for applying said interrogation pulse to said gating means.

19. In a memory system, a capacitor comprising a crystal of a material capable of existing in a paraelectric and in a ferroelectric state at a particular temperature and a pair of electrodes connected to substantially opposite faces of said crystal, each of said electrodes covering substantially all of the face to which it is connected, means maintaining the temperature of said material substantially constant at said particular temperature, means maintaining said capacitor biased at a potential at which said material maintained at said particular temperature is capable of existing stably in each of said states and capable of being switched back and forth between said states, the polarization of said material when in said stable paraelectric state at said bias potential being different than the polarization of said material when in said stable ferroelectric state at said bias potential, the voltage polarization characteristic of said biased capacitor defining the change in polarization therein when said material is switched back and forth between said first and second stable states being in the form of a hysteresis loop, each of the side portions of said loop including a segment having a negative slope, means coupled to said capacitor for applying thereto a pulse of a polarity and magnitude effective when said material is in said stable paraelectric state to cause one side portion of said loop to be traversed and said material to be switched to said ferroelectric state, said pulse applying means including means effective to apply to said capacitor a pulse of a polarity and magnitude effective when said material is in said stable ferroelectric state to cause the other side portion of said loop to be traversed and said material to be switched to said paraelectric state, and means coupled to said capacitor and responsive according to the capacitance presented by said capacitor to said applied pulses for detecting when one of said pulses is effective to switch said capacitor from one of said stable states to the other.

20. In a memory system, a capacitor having as a dielectric a body of a material capable of existing in a first and in a second crystalline state at a particular temperature, means maintaining the temperature of said material substantially constant at said particular temperature, means maintaining said capacitor biased at a potential at which said material maintained at said particular temperature is capable of existing stably in said first and second states and capable of being switched back and forth between said states, the polarization of said material when in said first stable state at said bias potential being different than the polarization of said material when in said second stable state at said bias potential, the voltage polarization characteristic of said biased capacitor defining the change in polarization therein when said material is switched back and forth between said first and second stable states being in the form of a hysteresis loop, the slope of the top portion of said loop being different than the slope of the bottom portion thereof, an inductive element coupled to said capacitor and forming therewith a resonant circuit, means for applying an alternating voltage to said resonant circuit, said alternating voltage being ineffective to switch said capacitor from one of said stable states to the other, said resonant circuit being resonant at the frequency of said alternating voltage when said capacitor is in one of said stable states, and an output terminal coupled to said resonant circuit.

21. In a memory system, a capacitor having as a dielectric a body of a material capable of existing in a first and in a second crystalline state at a particular temperature, means maintaining the temperature of said material substantially constant at said particular temperature, means maintaining said capacitor biased at a potential at which said material maintained at said particular temperature is capable of existing stably in said first and second states and capable of being switched back and forth between said states, the polarization of said material when in said first stable state at said bias potential being different that the polarization of said material when in said second stable state at said bias potential, the voltage polarization characteristic of said biased capacitor defining the change in polarization therein when said material is switched back and forth between said first and second stable states being in the form of a hysteresis loop, the slope of the top portion of said loop being different than the slope of the bottom portion thereof, an inductive element connected in parallel circuit relationship with said capacitor, means for applying an alternating voltage to said parallel connected capacitor and inductive element, said alternating voltage being ineffective to switch said capacitor from one of said stable states to the other, and an output terminal coupled to said parallel connected capacitor and inductive element.

22. In a memory system, a capacitor comprising a crystal of a material capable of existing in a first and in a second crystalline state at a particular temperature, and a pair of electrodes connected to substantially parallel opposite faces of said crystal each of said electrodes covering substantially all of the face to which it is connected, means maintaining the temperature of said material substantially constant at said particular temperature, means maintaining said capacitor biased at a potential at which said material maintained at said particular temperature is capable of existing stably in said first and second states and capable of being switched back and forth between said states, the polarization of said material when in said first stable state at said bias potential being different than the polarization of said material when in said second stable state at said bias potential, the voltage polarization characteristic of said biased capacitor defining the change in polarization therein when said material is switched back and forth between said first and second stable states being in the form of a hysteresis loop, the slope of the top portion of said loop being less than the slope of the bottom portion thereof, means coupled to said electrodes for applying to said capacitor a pulse of a polarity and magnitude effective when said material is in said first state to switch said material to said second state, said pulse applying means including means for applying to said capacitor a pulse of polarity and magnitude effective when said material is in said second state to switch said material to said first state, an inductive element coupled to said capacitor and forming therewith a resonant circuit, means for applying an alternating voltage to said resonant circuit, the amplitude of said alternating voltage being less than the amplitude required to switch said capacitor from one of said stable states to the other, said resonant circuit being resonant at the frequency of said applied alternating voltage when said capacitor is in one of said stable states, and an output terminal coupled to said resonant circuit.

23. In a memory system, a capacitor comprising a crystal of a material capable of existing in a first and in a second crystalline state at a particular temperature and a pair of electrodes connected to substantially parallel opposite faces of said crystal, each of said electrodes covering substantially all of the face to which it is connected, means maintaining the temperature of said material substantially constant at said particular temperature, means maintaining said capacitor biased at a potential at which said material maintained at said particulr temperature is capable of existing stably in said first and second states and capable of being switched back and forth between said states, the polarization of said material when in said first stable state at said bias potential being different than the polarization of said material when in said second stable state at said bias potential, the voltage polarization characteristic of said biased capacitor defining the change in polarization therein when said material is switched back and forth between said first and second stable states being in the form of a hysteresis loop, the slope of the top portion of said loop being less than the slope of the bottom portion thereof, an inductive element connected in parallel circuit relationship with said capacitor, means continuously applying an alternating voltage to said parallel connected capacitor and inductive element, the amplitude of said alternating voltage being less than the amplitude required to switch said capacitor from one of said stable states to the other, said parallel connected capacitor and inductive element being resonant at the frequency of said applied alternating voltage when said capacitor is in one of said stable states, and means coupled to said parallel connected capacitor and inductive element for manifesting the state of said capacitor.

24. The invention as claimed in claim 23, wherein said manifesting means includes a rectifying element coupled to said parallel connected capacitance and inductive element.

25. In a data storage system, a capacitor having as a dielectric a body of material which when thermally biased at a particular temperature and electrically biased at a particular potential is capable of existing in a first and in a second crystalline state and capable of being switched back and forth between said states, the polarization of said material when in said first state being different than the polarization of said material when in said second state, means maintaining the temperature of said material substantially constant at said particular temperature, means coupled to said capacitor maintaining said material biased at said particular potential, means coupled to said capacitor for applying thereto an electric field of a polarity and magnitude effective when said material maintained at said particular temperature, is in said first state to cause a transition in said material maintained at said particular temperature to said second state, and means for detecting when said applied field is effective to cause a transition in said material from said first to said second crystalline state.

26. In a data storage system a capacitor having as a dielectric a crystal of a material which when thermally biased at a particular temperature and electrically biased at a particular potential is capable of existing in a first and in a second crystalline state, the dielectric constant of said material when in said first state being different than the dielectric constant of said material when in said second state, means maintaining the temperature of said material substantially constant at said particular temperature, means coupled to said capacitor maintaining said material biased at said particular potential, means coupled to said capacitor for applying thereto an electric interrogation signal, and means coupled to said capacitor maintained at said particular temperature and responsive according to the capacitance presented by said capacitor maintained at said particular temperature to said interrogation signal for producing an output signal.

27. The invention as claimed in claim 26, wherein the electrodes of said capacitor are each connected to a different face of said crystal and each covers substantially all of the face to which it is connected.

28. A circuit element comprising a crystal of a material capable of existing in a first and in a second crystalline state at a particular temperature, a pair of electrodes each connected to a different face of said crystal, means maintaining the temperature of said crystal substantially constant at said particular temperature, means coupled to said electrodes for maintaining said material biased at a potential at which said material maintained at said particular temperature is capable of existing stably in each of said states, the polarization voltage characteristic of said electrically biased electroded crystal maintained at said particular temperature being in the form of a hysteresis loop which exhibits portions having a positive slope and portions having a negative slope, means coupled to said electrodes for causing said crystal to assume either of said crystalline states at said particular temperature and for applying an interrogation signal thereto, and further means responsive in accordance with the capacitance presented by said electroded crystal to said interrogation signal for manifesting the state thereof.

29. A storage device comprising a capacitor which when thermally biased at a particular temperature and electrically biased at a particular potential is capable of being caused to assume first and second different stable crystalline states by the application of electric signals of proper polarity and magnitude; means for thermally biasing said capacitor at said particular temperature; means for electrically biasing said capacitor at said particular potential; and means coupled to said capacitor for supplying electric signals thereto to selectively cause said capacitor thermally biased at said particular temperature and electrically biased at said particular potential to assume either of said stable crystalline states.

References Cited in the file of this patent

UNITED STATES PATENTS

| | | |
|---|---|---|
| 2,637,010 | Charske | Apr. 28, 1953 |
| 2,648,823 | Kock | Aug. 11, 1953 |
| 2,677,799 | Foster et al. | May 4, 1954 |
| 2,695,397 | Anderson | Nov. 23, 1954 |
| 2,717,356 | Foster | Sept. 6, 1955 |
| 2,717,373 | Anderson | Sept. 6, 1955 |

OTHER REFERENCES

"Double Hysteresis Loop of $BaTiO_3$ at the Curie Point" (Merz), Physical Review, vol. 91, No. 3, Aug. 1, 1953, pp. 513–517.

"The Dielectric Properties of Barium Titanate Single Crystals in the Region of their Upper Transition Temperature" (Cross), The Philosophical Magazine, ser. 7, vol. 44, No. 357, October 1953, pp. 1161–1170.